United States Patent [19]

Yoshimura et al.

[11] Patent Number: 5,216,460
[45] Date of Patent: Jun. 1, 1993

[54] AUTOMATIC FOCUSING CAMERA

[75] Inventors: Masazi Yoshimura; Satoshi Nakamoto, both of Hachioji, Japan

[73] Assignee: Konica Corporation, Tokyo, Japan

[21] Appl. No.: 867,779

[22] Filed: Apr. 13, 1992

[30] Foreign Application Priority Data

Apr. 16, 1991 [JP] Japan .................................. 3-111202

[51] Int. Cl.⁵ ............................................. G03B 13/36
[52] U.S. Cl. ........................................ 354/402; 354/403
[58] Field of Search .................................. 354/402, 403

[56] References Cited

U.S. PATENT DOCUMENTS

| | | | |
|---|---|---|---|
| 4,943,824 | 7/1990 | Nabeshima et al. | 354/403 X |
| 4,959,678 | 9/1990 | Nakagawa | 354/403 |
| 4,988,856 | 1/1991 | Hamada et al. | 354/402 X |
| 5,097,282 | 3/1992 | Itoh et al. | 354/402 X |
| 5,130,735 | 7/1992 | Kusaka et al. | 354/402 X |
| 5,136,148 | 8/1992 | Nonaka | 354/403 |

Primary Examiner—W. B. Perkey
Attorney, Agent, or Firm—Jordan B. Bierman

[57] ABSTRACT

An automatic focusing camera for exposing an image of an object on a film with a function of automatically focusing on the object. The camera includes a range-finding unit to measure the distance between the object and the camera, in which the range-finding unit is capable of measuring the distance with plural measuring areas; a circuit to calculate a moving speed of the object according the measured distance; a circuit to estimate a distance between the object and the camera when the camera exposes the image according to the measured distance by the range-finding unit and the calculated moving speed, before the camera exposes the image; a circuit to determine whether the moving speed exceeds a predetermined speed; and a controller to change the measuring area of the range-finding unit from one measuring area to the other area when the camera determines that the moving speed exceeds the predetermined speed.

4 Claims, 4 Drawing Sheets

AUTOMATIC FOCUSING CAMERA

BACKGROUND OF THE INVENTION

The present invention relates to an automatic focusing camera having: a movement predicting function by which the distance from the camera to a moving object is measured a plurality of times before photographing and focusing is performed according to the result of prediction conducted on the basis of the obtained range-finding information; and a wide range-finding function by which range-finding is conducted in plural areas which have been previously set with regard to the picture plane.

Recently, most cameras are provided with an autofocus device by which the distance to an object is measured and the picture-taking lens is automatically moved so that a picture in focus can be obtained.

When photographing a moving object such as a man or vehicle, using the aforementioned autofocus camera, the object moves during the period of time from when the release button is pressed to when the shutter is opened. Therefore, the obtained picture becomes out of focus. The higher the moving speed of the object, the more this tendency increases.

In order to overcome this problem, a camera has been proposed, for example, in the Japanese Patent Application Open to Public Inspection No. 159817/1988, which is characterized in that: after a range-finding operation has been conducted synchronously with a release button pressing operation, at least one more range-finding operation is conducted before the shutter is opened; the moving speed of the photographic object is calculated from the data obtained from the range-finding operations; the distance from the camera to the photographic object at the time when the shutter is opened, is predicted from the calculation in which the time required for lens moving and shutter opening is incorporated, which is called "moving object prediction"; and the picture-taking lens is moved to a position corresponding to the calculated photographic object distance, and then photographing is performed. In a camera in which this moving object prediction is adopted, an in-focus photograph of a moving photographic object can be taken.

In a conventional moving object prediction camera, a range-finding operation is conducted on a photographic object located in a range-finding area which has been set approximately in the center of a picture plane, and moving object prediction is performed in accordance with the obtained range-finding data. Consequently, in the case of a photographic object which moves diagonally with regard to the optical axis of the camera, the photographic object may move out of the range-finding area while moving object prediction is being performed. As a result, the obtained range-finding data is deviated, so that the predicted photographic object distance differs from the actual distance, and the obtained photograph becomes out of focus.

The inventors have considered an autofocus camera having a wide range-finding function in which: a plurality of range-finding areas are set on a picture plane; a range-finding operation is conducted on each range-finding area; and when appropriate range-finding data is found, a focusing operation is conducted according to the range-finding data. It is a primary object of the present invention to provide an autofocus camera in which a plurality of range-finding operations are conducted so that moving object prediction can be performed, characterized in that: a moving object prediction is conducted even on a photographic object which moves diagonally with regard to the optical axis of the camera to conduct moving object prediction, so that a focused photograph can be taken.

SUMMARY OF THE INVENTION

In order to accomplish the aforementioned object, the present invention is to provide an autofocus camera comprising: a wide range-finding means which conducts a range-finding operation on a plurality of range-finding areas previously set with respect to the picture plane of the present invention; a moving object prediction means which detects the moving speed of a photographic object and predicts the distance of a photographic object from the camera; a speed judging means which judges whether the moving speed of the photographic object detected by said moving object prediction means is higher than a predetermined speed or not; and a control means which controls to change over the range-finding area to be used for moving object prediction, from the first range-finding area to the second range-finding area when it has been judged that the moving speed of the photographic object according to the first range-finding area moving speed prediction conducted by said speed judging means, is higher than the predetermined moving speed.

When a moving object predicting operation is being conducted with regard to a plurality of range-finding areas which have set on a picture plane, and when the moving speed of the photographic object obtained from the first range-finding area moving object prediction is higher than the predetermined value, the range-finding area to be used for the moving object prediction is changed over from the first range-finding area to the second range-finding area.

DETAILED DESCRIPTION OF THE INVENTION

Referring to the attached drawings, the present invention will be explained as follows.

Figure 1:
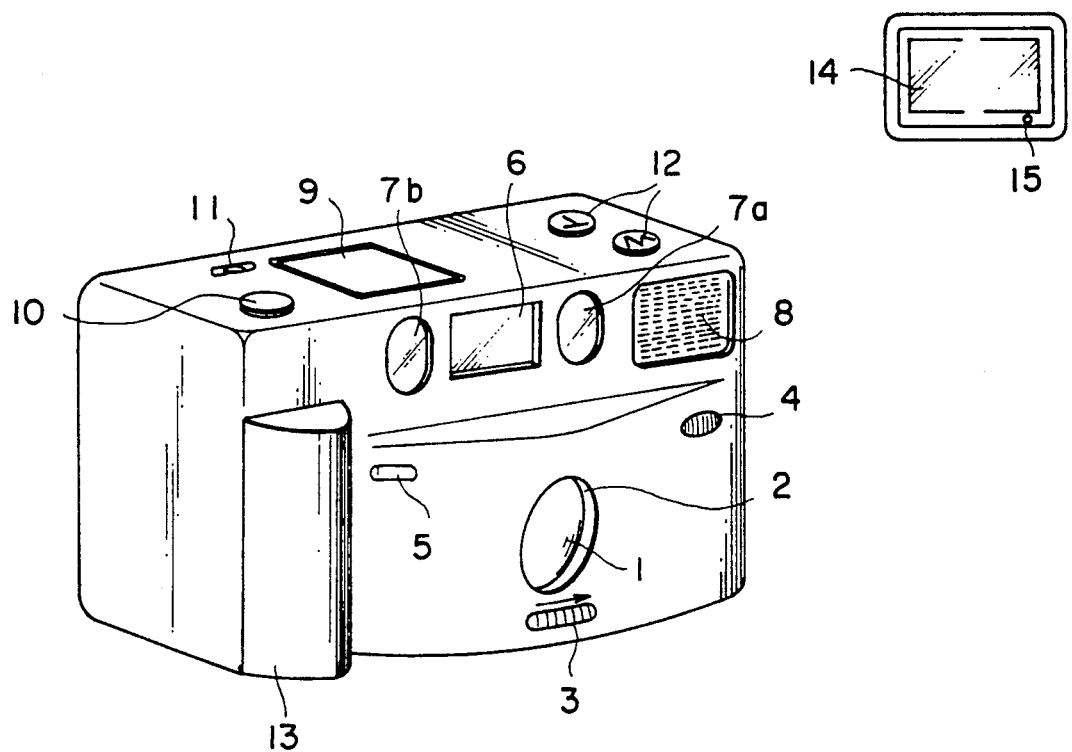
FIG. 1 is a perspective view showing the appearance of an example of an autofocus camera according to the present invention.

FIG. 1 is a perspective view of an example of an autofocus camera according to the present invention. Here is shown a camera, the focal distance of which is variable, and the shutter of which is released by a signal converted from sound pressure. However, it should be appreciated that the present invention is not limited to the specific embodiments.

In FIG. 1, a picture-taking lens 1 is disposed in the front center of the camera. A slidable lens cover (referred to as a barrier) 2 is provided in such a manner that it covers the lens 1. Right below the picture-taking lens 1, is provided a slidable switch 3 which can be slid in a transverse direction. When the slidable switch 3 is slid in the direction of an arrow, main switch $S_0$ of the camera is turned on, and at the same time, the lens cover 2 is opened. A microphone 4, which collects the sounds around the camera, is provided on the right of the front surface of the camera, and a light emitting diode 5 is provided on the left of the front surface of the camera. A viewfinder window 6 is disposed in the center of the upper portion of the front surface. An infrared ray emitting window 7a used for range-finding is disposed on the right of the viewfinder window 6, and a light receiving window 7b also used for range-finding is disposed on the left of the viewfinder window 6. A strobe light emitting window 8 is provided at the right edge of the camera.

On the upper surface of the camera, a little left of center, a liquid crystal display window 9 is provided which displays information relating to photographing such as the residual capacity of the battery and the number of unexposed frames. A release button 10 and a mode selecting switch 11 are provided in a position close to the left edge of the camera. A zoom switch 12 which changes over between telescopic function and wide angle function, is provided in a position close to the right edge of the camera. A battery chamber 13 in which a battery is accommodated, is formed in a position close to the left edge of the camera.

An ocular eyepiece 14 of the viewfinder is provided in the upper center on the reverse side of the camera, wherein the ocular eyepiece 14 is shown in the right upper portion of FIG. 1. When a photographer looks into the ocular eye piece 14, he can see light emitting diode 15 which is used to warn the photographer that a photographic object is located too close.

Figure 2:
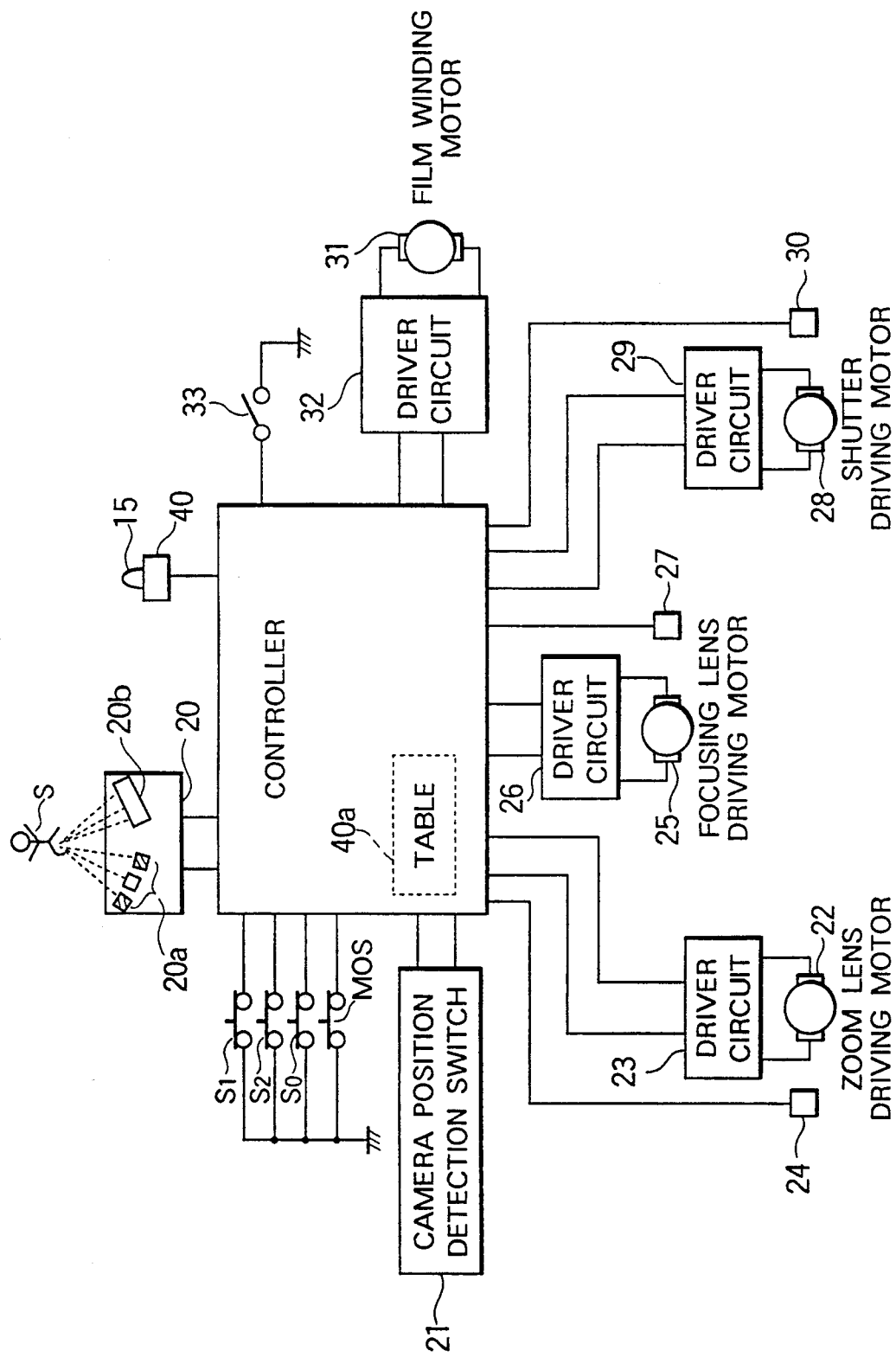
FIG. 2 is a control circuit diagram of the autofocus camera shown in FIG. 1.

FIG. 2 is a block diagram of a control circuit which controls the operation of a camera according to the present invention.

In FIG. 2, numeral 20 is a range-finding system by which moving object prediction and wide range-finding can be conducted. The range-finding system to conduct wide range finding is well known, for example, it has been disclosed in the Japanese Patent Application Open to Public Inspection No. 18534/1990. For example, a plurality of infrared ray emitting diodes 20a (in this example, three infrared ray emitting diodes) are disposed in the camera body in such a manner that the optical axis of each diode is slightly different from other two. In the case of a camera in which the picture-plane is divided into three areas, center, right and left, wherein a range-finding operation is conducted at each area, infrared rays are successively emitted from each infrared ray emitting element through a light emitting window 7a of the camera when range-finding is conducted. The emitted infrared ray is reflected by a photographic object and received by a light receiving element installed in the camera, for example, it is received by a photoelectric transfer element 20b referred to as PSD (Position Sensitive Device) so that it can be converted into a range-finding signal. A plurality of range-finding signals outputted from the photoelectric transfer element 20b is processed by a controller 40 which will be described later, and the range-finding information found from one of the range-finding signals is used for a focusing operation which will be described later.

Figure 3:
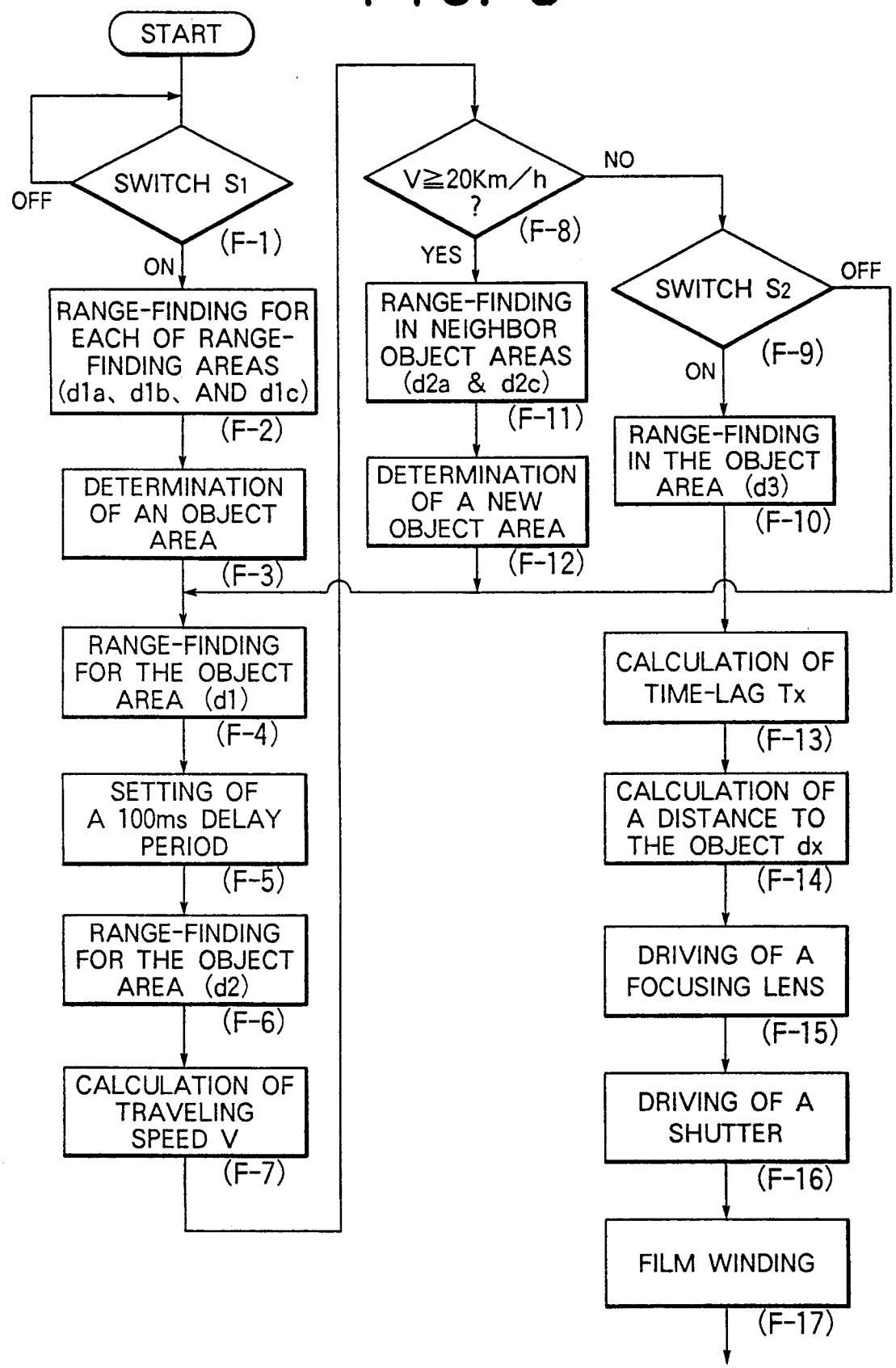
FIG. 3 is a flow chart explaining an operation in an example of moving object prediction of an autofocus camera according to the present invention.

FIG. 3 is a flow chart showing moving object prediction of a camera of the present invention.

When the release button 10 is lightly pressed for its first stroke, switch $S_1$ is turned on (F-1), and wide range-finding is performed by the range-finding system 20. That is, three infrared ray emitting diodes 20a provided in the range-finding system 20 emit light sequentially. First, the range-finding operation is conducted on the left range-finding area, next on the central range-finding area, and finally on the right range-finding area (F-2). As a result, range-finding data $d_{1a}$, $d_{1b}$, $d_{1c}$ can be obtained. In the controller 40, obtained range-finding data $d_{1a}$, $d_{1b}$, $d_{1c}$ are compared with each other, and it is determined that the main photographic object is located in the range-finding area (for example, the range-finding area in the center of the picture-plane) in which the closest range-finding data (for example, range-finding data $d_{1b}$) has been obtained (F-3). In this case, the main photographic object is defined as an object to be photographed. For example, when a portrait is taken, the photographic object is not the background but the person. Several methods to judge in which range-finding area the main photographic object is located, utilizing a plurality of data obtained by a wide range-finding operation, have been conventionally proposed (for example, Japanese Patent Application Open to Public Inspection No. 107332/1984). However, in this example, it is judged that the main photographic object is located in a range-finding area in which the closest range-finding data has been obtained.

In the manner described above, the range-finding area in which the main photographic object is located, that is, the object area is determined. Then, a range-finding operation is conducted on the area so that range-finding data $d_1$ is obtained (F-4). Then, a delay period of 100 msec is set (F-5). The second range-finding operation is conducted on the same object area so that range-finding data $d_2$ is obtained (F-6). In controller 40, the moving speed of the photographic object is calculated from the first range-finding data $d_1$ and the second range-finding data $d_2$, using equation 1 (F-7).

$$v = (d1 \text{ mm} - d2 \text{ mm})/100 \text{ msec} \qquad \text{[Equation 1]}$$

It is judged whether moving speed v obtained in the aforementioned manner is not less than a predetermined speed (for example, 20 km/hour) or not (F-8). When moving speed v is not more than the predetermined speed, the release button 10 is fully pressed according to the conventional moving object prediction method, and when switch $S_2$ is turned on (F-9), the third range-finding operation is conducted on the same object area, that is the range-finding area in the center of the picture-plane (F-10), so that range-finding data $d_3$ is obtained. When the release button 10 can not be pressed any further down, the process returns to step (F-4) and the moving object predicting operation is conducted again.

When it is judged in step (F-8) that moving speed v of the photographic object calculated in the moving object calculation is higher than the predetermined speed (in the aforementioned case, 20 km/hour), it is determined that the photographic object has moved diagonally with regard to the optical axis so that it has moved from the object area (in the aforementioned case, the range-finding area in the center of the picture plane). Therefore, a range-finding operation is conducted on both right and left range-finding areas, which are next to the aforementioned photographic object area (F-11). This range-finding operation is conducted when the infrared ray emitting elements 20a disposed on the right and left are activated to emit infrared rays (the infrared ray emitting elements are hatched in FIG. 2). As a result, range-finding data $d_{2a}$ can be obtained from the range-finding area on the right of the picture plane, and range-finding data $d_{2c}$ can be obtained from the range-finding area on the left of the picture plane. Either range-finding data $d_{2a}$ or $d_{2c}$, which is closer to range-finding data $d_1$ obtained from the range-finding area in the center of the picture plane, is selected, and the area corresponding to the selected range-finding data is determined to be a new photographic object area (F-12). The reason is that: when the photographic object has moved diagonally from one range-finding area to another, the range-finding data obtained in both areas become relatively close.

After range-finding data $d_3$ has been obtained in step (F-10), total time lag $T_X$ of a period of time required for moving the picture-taking lens to the focusing point and that required for opening the shutter, is calculated with obtained range-finding data $d_3$ (F-13). The period of time necessary for moving the picture-taking lens to the focusing point (which is referred to as a lens drive period) can be calculated from the number of stepped teeth to drive the picture-taking lens 1, using the following lens drive period prediction table 40a which is installed in the controller 40. In this case, the number of stepped teeth for driving can be known from the output of the picture-taking lens position sensor 27.

TABLE 1

| Number of Stepped Teeth | Lens Drive Period (msec) |
| --- | --- |
| 1-3 | 100 |
| 4-6 | 200 |
| 7-9 | 300 |
| 10-12 | 400 |

The operation period of time of the picture-taking lens and that of the shutter drive mechanism may be set constant. However, they varies according to the environmental temperature and total operating time, so that they may be calculated each time or changed according to the season.

Photographic object moving distance $d_x$ after the third range-finding operation has been conducted, is calculated from time lag $T_x$ calculated in the aforementioned manner and the moving speed of the photographic object (F-14).

After that, a series of sequence, the first step of which is picture-taking lens drive (F-15), is started. When the steps of shutter drive (F-16), film winding (F-17) and photographing of one frame have been completed, the process returns to the main sequence.

In the manner described above, when the moving speed of the photographic object which is calculated for prediction from the range-finding data, is abnormally high, it is judged that the photographic object has got out from the range-finding area, and then the range-finding operation is conducted on an adjacent range-finding area so that a new photographic object, that is a range-finding area in which the photographic object is located, is determined to continue the operation of moving object prediction. Consequently, even when the photographic object moves diagonally with respect to the optical axis, it becomes possible to conduct moving object prediction.

In the aforementioned example, when the photographic object has got out from the photographic object area, it is regarded that the photographic object has moved to an adjacent area, and the adjacent area is adopted for a new object area. However, when the moving speed of the photographic object is high, an area adjacent to the original photographic object area does not necessarily become a new photographic object area.

Figure 4:
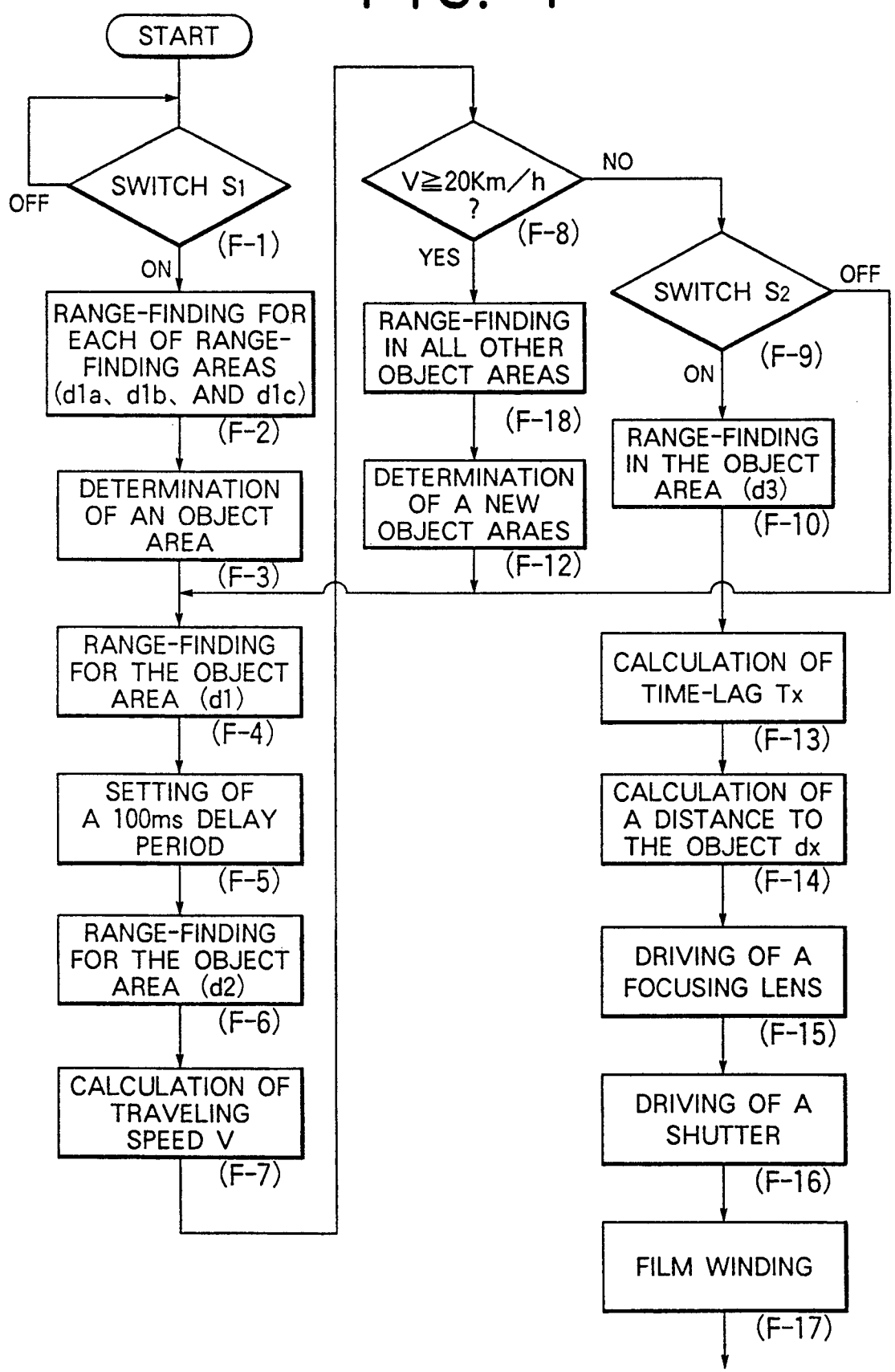
FIG. 4 is a flow chart explaining an operation in another example of moving object prediction of an autofocus camera according to the present invention.

FIG. 4 shows an example in which the aforementioned case is taken into account. An example is taken so as to be explained in which five range-finding areas are set on the picture plane.

This example is different from the example shown in FIG. 3 in such a manner that: in this example, the range-finding area at step (F-18) is not an area adjacent to the original object area; and the range-finding operation is conducted on the remaining four areas. In the same manner as the example shown in FIG. 3, a range-finding area in which one of the four range-finding data obtained as a result of range-finding operations, which is closest to range-finding data $d_1$ obtained in step (F-4), can be obtained, is adopted for the photographic object area.

According to this example, even when a photographic object, the moving speed of which is high, moves diagonally with respect to the optical axis, a photograph in focus can be obtained.

In the two examples explained above, the original photographic object area is determined, utilizing wide range-finding. However, the photographic object area may be determined in such a manner that: a photographer looks into the viewfinder and sets the camera so that the photographic object is located in a specific range-finding area.

In the aforementioned examples, light emitting elements and light receiving elements are used both for wide range-finding and moving object prediction. However, exclusive elements may be provided for wide range-finding and moving object prediction. The wide range-finding system may be composed of a plurality of infrared ray emitting elements as shown in the example, and also it may be composed of one infrared ray emitting element which is rotated a predetermined angle at a time so as to emit infrared rays to a plurality of range-finding areas.

In this example, explanations have been conducted on an active system of range-finding means. However, the present invention is not limited to the specific examples, and the present invention can be applied to a passive system of range-finding means in which a reflected optical image sent from a photographic object is detected and the change of spatial frequency is detected.

As explained above, according to the present invention, when the range-finding data is remarkably changed in the case where moving object prediction is being conducted in such a manner that a plurality of range-finding operations are conducted in one of a plurality of range-finding areas which have been previously set in the picture plane, moving object prediction is conducted in another range-finding area in which the photographic object is located. Consequently, even when the photographic object moves diagonally with respect to the optical axis of the camera, it is possible to conduct a moving object predicting operation, and a photograph in focus can be taken without losing the best photographing chance.

What is claimed is:

1. An automatic focusing camera for exposing an image of an object on a photosensitive material, comprising;

means for measuring a first distance between said object and said camera, wherein said measuring means has a plurality of measuring areas including a first measuring area and a second measuring area, and each of said measuring area is capable of measuring said first distance;

means for calculating a moving speed of said object according to said first distance measured with said first measuring area;

means for estimating a second distance between said object and said camera when said camera exposes said image, according to said first distance and said moving speed, before said camera exposes said image;

means for determining whether said moving speed exceeds a predetermined speed; and means for changing the measuring area of said measuring means from said first measuring area to said second measuring area when said determining means determines that said moving speed exceeds said predetermined speed.

2. The camera of claim 1, wherein said plurality of measuring areas includes a third measuring area, and said first distance measured with said second measuring area is closer to said first distance measured with said first measuring area than said first distance measured with said third measuring area.

3. The camera of claim 1, wherein said first measuring area is adjacent to said second measuring area.

4. The camera of claim 1, further comprising:
means for selecting the measuring area, where said measuring means measures said first distance, from said plurality of measuring areas.

* * * * *